US012794161B2

(12) United States Patent
Zheng et al.

(10) Patent No.: US 12,794,161 B2
(45) Date of Patent: Nov. 10, 2026

(54) HOT SWAP BASE FOR A BUILDING CONTROLLER

(71) Applicant: HONEYWELL INTERNATIONAL INC., Charlotte, NC (US)

(72) Inventors: Michael Zheng, Charlotte, NC (US); Yong Mu, Charlotte, NC (US); Ke Zhang, Charlotte, NC (US); Konstantinos Kafandaris, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 338 days.

(21) Appl. No.: 18/291,067

(22) PCT Filed: Jul. 27, 2021

(86) PCT No.: PCT/US2021/043299

§ 371 (c)(1),
(2) Date: Jan. 22, 2024

(87) PCT Pub. No.: WO2023/009105

PCT Pub. Date: Feb. 2, 2023

(65) Prior Publication Data

US 2024/0356260 A1 Oct. 24, 2024

(51) Int. Cl.
*H01R 12/71* (2011.01)
*H01R 12/72* (2011.01)
(Continued)

(52) U.S. Cl.
CPC ........... *H01R 13/18* (2013.01); *H01R 12/724* (2013.01); *H01R 13/193* (2013.01)

(58) Field of Classification Search
CPC .... H01R 13/18; H01R 12/724; H01R 13/193; H05K 7/1478
See application file for complete search history.

(56) References Cited

U.S. PATENT DOCUMENTS 6,215,204 B1 * 4/2001 Brown ................. H05K 7/1471 307/326
6,388,563 B1 * 5/2002 Brown ..................... H01H 9/08 200/557

(Continued)

FOREIGN PATENT DOCUMENTS

DE 10249981 B3 4/2004

OTHER PUBLICATIONS

Invitation to Pay Additional Fees dated Apr. 28, 2022 for International Application No. PCT/US2021/043299.

(Continued)

*Primary Examiner* — Abdullah A Riyami
*Assistant Examiner* — Nelson R. Burgos-Guntin
(74) *Attorney, Agent, or Firm* — Seager, Tufte & Wickhem, LLP

(57) ABSTRACT

A building controller receiving base for receiving a building controller. The building controller may include a building controller housing that houses a building controller electrical connector that includes a spring contact extending outside of the building controller housing. The building controller receiving base includes a base housing including one or more attachment features for releasably securing the building controller to the base housing, and a base electrical connector housed by the base housing. The base electrical connector includes a spring contact extending outside of the base housing at a location that is aligned with the spring contact of the building controller electrical connector when the building controller is secured to the base housing via the one or more attachment features. The base electrical connector further comprises a first terminal pin that extends outside of the base housing and is accessible from outside of the base housing.

20 Claims, 12 Drawing Sheets

(51) Int. Cl.
*H01R 13/18* (2006.01)
*H01R 13/193* (2006.01)

(56) References Cited

U.S. PATENT DOCUMENTS

| | | | | |
|---|---|---|---|---|
| 6,392,319 | B1 | 5/2002 | Zebermann et al. | |
| 8,961,201 | B2 * | 2/2015 | Griese | H01R 9/2675 439/121 |
| 9,527,394 | B1 * | 12/2016 | Tang | B60W 10/26 |
| 2007/0046837 | A1 | 3/2007 | Elberbaum | |
| 2007/0275586 | A1 * | 11/2007 | Ngo | H01R 13/28 439/290 |
| 2009/0236909 | A1 * | 9/2009 | Aldag | H01R 25/142 340/654 |
| 2010/0328853 | A1 * | 12/2010 | Johnson | H02G 3/38 361/641 |
| 2013/0045613 | A1 | 2/2013 | Greise et al. | |
| 2014/0126158 | A1 * | 5/2014 | Baran | H01H 89/00 439/350 |
| 2015/0295336 | A1 * | 10/2015 | Cole | H01R 12/71 439/81 |
| 2015/0333423 | A1 | 11/2015 | Busch et al. | |
| 2018/0254615 | A1 * | 9/2018 | Asanza Maldonado | E04F 21/18 |
| 2019/0052008 | A1 * | 2/2019 | Consoli | H05K 7/1417 |
| 2019/0195473 | A1 * | 6/2019 | Tuchler | H01R 25/142 |

OTHER PUBLICATIONS

International Preliminary Report on Patentability dated Jan. 18, 2024 for International Application No. PCT/US2021/043299.

* cited by examiner

HOT SWAP BASE FOR A BUILDING CONTROLLER

TECHNICAL FIELD

The present disclosure relates generally to controllers, and more particularly to methods and systems for mounting and/or connecting such controllers.

BACKGROUND

Automation, process control and other systems often employ controllers and/or other devices to control various aspects of the system. Automation systems can include, for example, Building Automation Systems (BAS). BAS systems can include, for example, Heating, Ventilation and/or Air Conditioning (HVAC) systems, security systems, access control systems, fire systems, lighting systems and/or any other suitable building control system. Process control systems can include industrial process control systems for controlling part or all of an industrial process. Industrial processes can include, for example, chemical processes such as oil refining processes, chemical production processes, distilling processes, food production processes, electronic production processes, robotic processes, and/or any other suitable industrial process. These are just examples.

It is often desirable to replace failing controllers and/or upgrade legacy controllers during routine or urgent maintenance of a system. Replacing and or upgrading controllers can require that the system be powered down and/or taken off-line, and be disruptive, costly and time consuming. What would be desirable are methods and systems for hot swapping controllers of a system in an efficient and convenient manner.

SUMMARY

The present disclosure relates generally to controllers, and more particularly to methods and systems for mounting and/or connecting controllers such that the controllers can be hot swapped in an efficient and convenience manner.

In a first example, a building controller receiving base for receiving a building controller is provided. The illustrative building controller includes a building controller housing that houses a building controller electrical connector that includes a spring contact extending outside of the building controller housing. The illustrative building controller receiving base includes a base housing with one or more attachment features for releasably securing the building controller to the building controller base housing. The illustrative building controller receiving base also houses a base electrical connector that includes a spring contact extending outside of the base housing at a location that is aligned with the spring contact of the building controller electrical connector when the building controller is secured to the base housing via the one or more attachment features. The base electrical connector further includes a first terminal pin that extends outside of the base housing and is accessible from outside of the base housing.

In another example, a modular building controller receiving base includes a main unit and an extension unit. The main unit includes a main unit housing including a front, a back and at least a first side and an opposing second side, a first plurality of electrical connectors each extending between and accessible from the first side of the main unit housing and the opposing second side of the main unit housing, and a second plurality of electrical connectors each extending between and accessible from the first side of the main unit housing and the opposing second side of the main unit housing. Each electrical connector of the first plurality of electrical connectors and the second plurality of electrical connectors include an electrically conductive bridge housed by the main unit housing and a spring contact mechanically and electrically connected to the electrically conductive bridge. The spring contact extends outside of the main unit housing and is accessible from outside of the main unit housing. The spring contacts of the first plurality of electrical connectors and the spring contacts of the second plurality of electrical connectors may be configured to electrically engage a plurality of electrical connectors on a controller when the controller is releasably received by the main unit.

The extension unit in this example includes an extension unit housing with a front, a back and at least a first side and an opposing second side, a first plurality of electrical connectors each extending between and accessible from the first side of the extension unit housing and the opposing second side of the extension unit housing, and a second plurality of electrical connectors each extending between and accessible from the first side of the extension unit housing and the opposing second side of the extension unit housing. The illustrative extension unit is releasably couplable mechanically and electrically to the main unit. When releasably coupled, each of the first plurality of electrical connectors of the extension unit are electrically connected to a corresponding one of the first plurality of electrical connectors of the main unit and each of the second plurality of electrical connectors of the extension unit are electrically connected to a corresponding one of the second plurality of electrical connectors of the main unit.

In yet another example, a modular controller assembly includes a base and a building controller, where the base is configured to releasably receive the building controller. In this example, the base includes a base housing with a front, a back and at least a first side and an opposing second side. The base housing includes one or more attachment features for releasably securing the building controller to the base housing and an electrical connector extending between and accessible from the first side of the base housing and the second side of the base housing. The electrical connector includes an electrically conductive bridge housed by the base housing and a spring contact mechanically and electrically connected to the electrically conductive bridge. The spring contact extends outside of the base housing and is accessible from outside of the base housing. In this example, the building controller includes a controller housing with a front, a back and at least a first side and an opposing second side, a printed circuit board housed by the controller housing, and an electrical connector electrically connected to the printed circuit board. The electrical connector includes a first spring contact, a second spring contact, and an electrically conductive bridge mechanically and electrically connecting the first spring contact and the second spring contact. The spring contact of the electrical connector of the base is configured to electrically engage the first spring contact of the electrical connector of the building controller when the building controller is releasably secured to the base housing.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
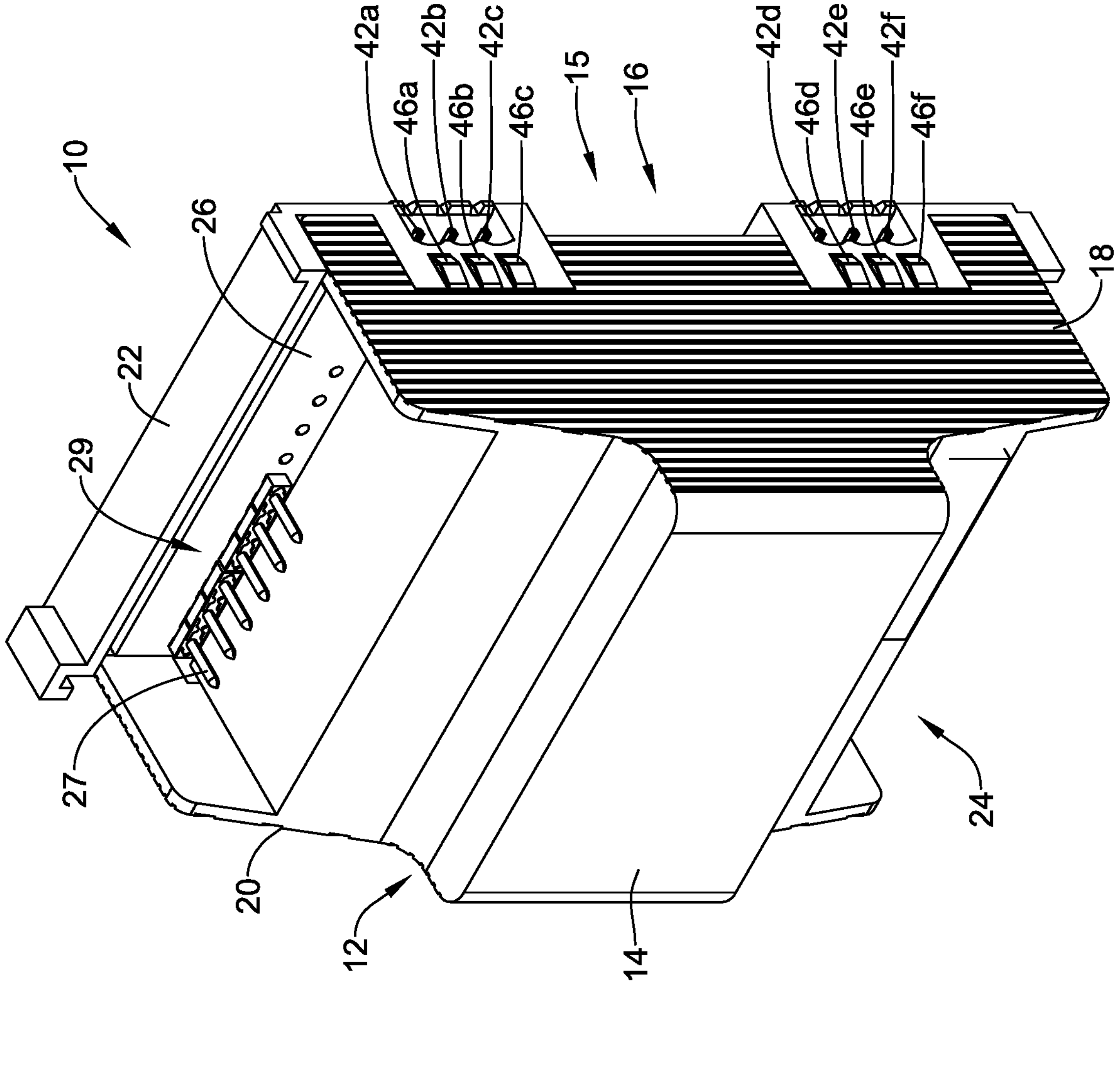
FIG. 1 is a perspective view of an illustrative but non-limiting electronic device.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

It is contemplated that the present electronic device receiving base may be used to connect one or more suitable electrical devices of, for example, an automation, process control and/or other system. However, to help illustrate, the present electrical connector is described with reference to an automation and/or process control system, such as a Building Automation Systems (BAS). Such systems may include a controller and a plurality of electrical control devices or input/output (I/O) devices. In some instances, the controller may include control circuitry and logic configured to operate, control, command, etc. various components of the Building Automation Systems (BAS). In some cases, the controller may provide these instructions to I/O devices or modules, which may in turn relay the control commands to various components of the Building Automation Systems (BAS). In some instances, the various components of the Building Automation Systems (BAS) may provide information related to the system, such as sensor readings, environmental conditions, etc. to the I/O devices, which in turn relay some or all of this information to the controller. In some cases, the controller and/or I/O devices may be mounted along a DIN rail, bus bar or other mounting arrangement. To facilitate control of the various devices and/or communication therebetween, the controller, I/O devices, and/or various components may be electrically and communicatively coupled to one another. To facilitate coupling and uncoupling of the devices, it may be desirable to provide the electronic devices with more than one option for electrically coupling the devices to one another. In some cases, it may be desirable to swap out devices without stopping, powering down, and/or restarting the control system (e.g., hot swap devices). Further, it may be desirable to facilitate the coupling and uncoupling of the devices without having to move other electrical devices that are mounted adjacent to the controller on a DIN rail or the like. These are just examples.

FIG. 1 is a perspective view of an illustrative but non-limiting electronic device 10 having a housing 12. The electronic device 10 may be a controller, an I/O device or any other electronic device. The features described herein may be applied to controllers, process devices, actuators, valves, sensors, etc. The illustrative housing 12 includes a front side 14, a back side 16, and at least a first side 18, and a second opposing side 20. The first and second sides 18, 20 may each extend from or between the front 14 to the back 16. The housing 12 may further include a top 22 and an opposing bottom 24. The top and bottom 22, 24 may extend from or between the first and second sides 18, 20. The use of the terms "front", "back", "first", "second", "top", and "bottom" are not intended to limit the electronic device 10 to a particular orientation, but rather to facilitate discussion of relative orientation. Further, the housing 12 is not limited to a rectangular or generally rectangular structure. Other shapes may be used for the housing 12, as desired. Some illustrative electronic devices and electrical connectors are described in commonly assigned U.S. patent application Ser. No. 16/837,579, filed on Apr. 1, 2020, and titled ELECTRICAL CONNECTOR FOR A CONTROLLER, the disclosure of which is hereby incorporated by reference.

The illustrative electronic device 10 may include a printed circuit board (PCB) (not shown). The PCB may be completely or partially housed within the housing 12. While not explicitly shown, the PCB may include electrical and/or electronic components that may include control logic and/or communication capabilities. These components may be electrically connected to one another and mechanically fastened to the PCB. In some cases, the PCB may include a plurality of pins 27 positioned exterior to the housing 12 extending towards the front 14 thereof. The pins 27 may form one or more front facing connector(s) 29 that face and are accessible from the front 14 of the housing 12. While not explicitly shown, the electronic device 10 may include other pins, terminal connectors, etc. for coupling the PCB to other devices.

Figure 2:
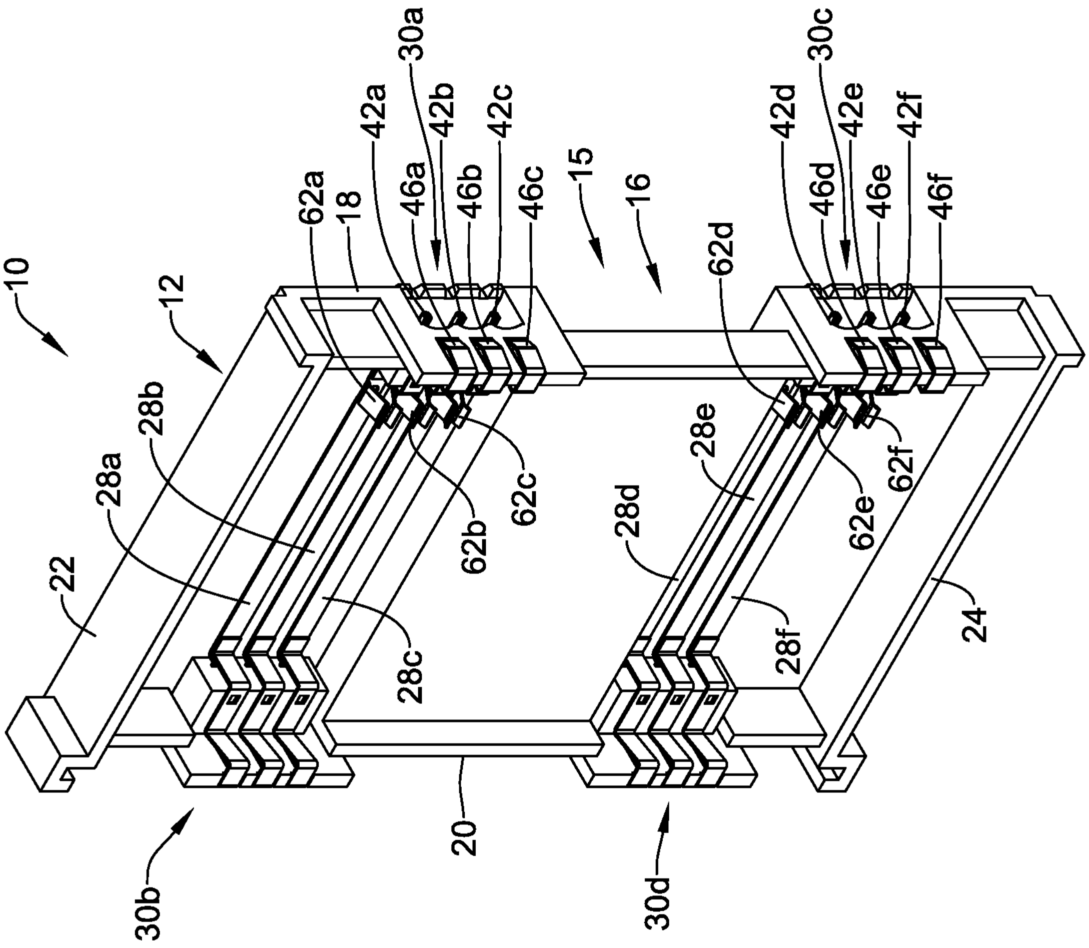
FIG. 2 is a perspective view of the illustrative electronic device of FIG. 1 with some components removed.

FIG. 2 is a perspective view of the illustrative electronic device 10 of FIG. 1 with the front 14 of the housing 12 and the PCB removed. The illustrative electronic device 10 includes one or more electrical connectors 28*a-f* (collectively, 28). Each of the electrical connectors 28 may be electrically connected to the PCB (not shown) via terminal receiving slot 62*a-f*, and may be configured to electrically couple the PCB of the electronic device 10 to other devices. The electronic device 10 may include any number of electrical connectors 28 as desired. The electrical connectors 28 may be grouped together to form ports 30*a-d* (collectively, 30). For example, the number of electrical connectors 28 provided may depend on how the electronic device 10 is to be connected to another electronic device. For example, a first port type may require three electrical connectors to form a port 30*a*. A first electrical connector 28*a* of the port may be for power, a second electrical connector 28*b* of the port 30*a* may be for ground, and a third electrical connector 28*c* of the port 30*a* may be for serial data. Another port type (e.g., RS485) may require six electrical connectors 28*a-f* to form two ports 30*a*, 30*c*. The first port 30*a* may be for power while the second port 30*c* is for data. These are just examples. In some cases, the electrical connectors 28 may extend from the first side 18 of the housing 12 to the second side 20 of the housing 12 such that each group of three electrical connectors 28*a-c*, 28*d-f* forms two ports 30*a*, 30*b* and 30*c*, 30*d*, respectively. It should be understood that the ports 30*a*, 30*c* provided on the first side 18 may be connected to a first device while the ports 30*b*, 30*d* on the second side 20 may be connected to a second, different device, providing a pass through connection. For example, the ports 30*a*, 30*c* may be for receiving an input and/or delivering an output from a first device while the ports 30*b*, 30*d* may be for receiving an input and/or delivering an output to a second or different device. In some cases, only two of the ports may be provided. For example, two of the ports (e.g., port 30*a* and port 30*b* or port 30*c* and port 30*d*) may not be present. In some cases, only one port may be provided. As will be described in more detail herein, in some cases, one or more ports 30 may be connected to a receiving base.

Figure 3:
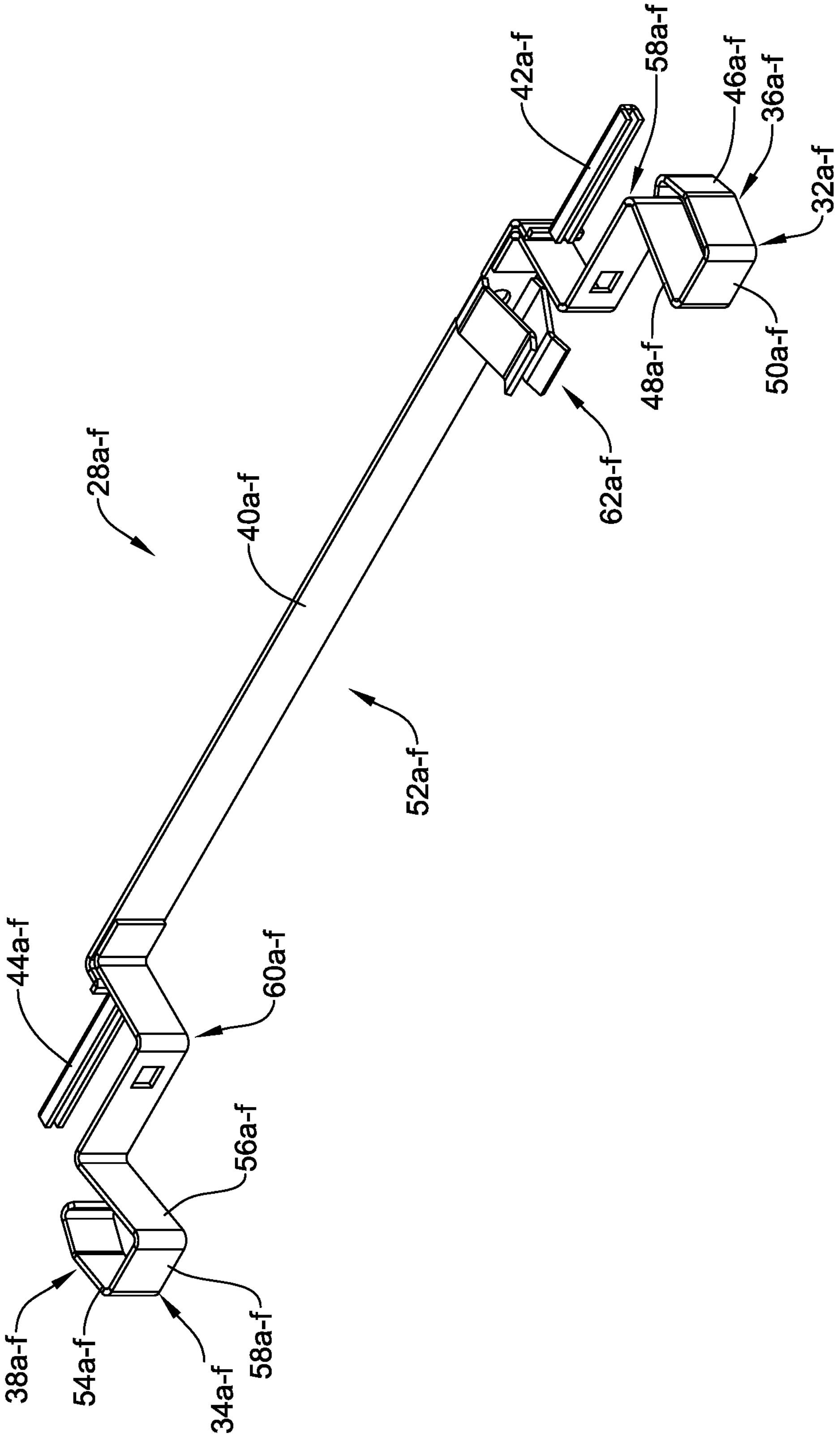
FIG. 3 is a perspective view of one of a plurality of electrical conductors shown in FIG. 2.

FIG. 3 is a perspective view of one of the plurality of electrical connectors 28*a-f* of FIG. 2 shown in detail. In the example shown, each electrical connectors 28*a-f* of the electronic device 10 has an identical structure to that described with respect to FIG. 3. However, in other examples, one or more of the electrical connectors 28*a-f* may have a different structure. The electrical connectors 28*a-f* extend from a first end 32*a-f* to a second end 34*a-f*. The electrical connectors 28*a-f* may include a first touch flake or spring contact 36*a-f* adjacent to the first end 32*a-f* thereof and a second touch flake or spring contact 38*a-f* adjacent to the second end 34*a-f* thereof. Each spring contact 36*a-f*, 38*a-f* may be mechanically and electrically connected or coupled to and extend from a base or an electrically conductive bridge 40*a-f*. The electrical connectors 28*a-f* may further include a first terminal pin 42*a-f* adjacent to the first end 32*a-f* thereof and a second terminal pin 44*a-f* adjacent to the second end 34*a-f* thereof. In some cases, the first and second terminal pins 42*a-f*, 44*a-f* may extend generally parallel to a longitudinal axis of the conductive bridge 40*a-f*, although this is not required. Each terminal pin 42*a-f*, 44*a-f* may be mechanically and electrically connected or coupled to and extend from the electrically conductive bridge 40*a-f*. Each conductive bridge 40*a-f* may mechanically and electrically connect the first and second spring contacts 36*a-f*, 38*a-f* and the first and second terminal pins 42*a-f*, 44*a-f* of the corresponding electrical connectors 28*a-f*.

In some cases, the first and second spring contacts 36*a-f*, 38*a-f*, the first and second terminal pins 42*a-f*, 44*a-f*, and the conductive bridge 40*a-f* for each of the electrical connectors 28*a-f* may be formed as a single monolithic structure. For example, each of the electrical connectors 28*a-f* may be stamped from a single monolithic electrically conductive material. In other cases, one or more of the first and second spring contacts 36*a-f*, 38*a-f*, the first and second terminal pins 42*a-f*, 44*a-f*, and/or the conductive bridge 40*a-f* may be formed as a discrete structure and subsequently coupled to the other components. Some illustrative but non-limiting coupling techniques may include, but are not limited to, welding, soldering, brazing, etc.

In some cases, either the spring contacts 36*a-f*, 38*a-f* or the terminal pins 42*a-f*, 44*a-f* may be used to form an electrical connection with another device. For example, as will be described in more detail herein, the spring contacts 36*a-f*, 38*a-f* may be brought into contact with corresponding spring contacts of another device to form an electrical connection therebetween. In another example, a female terminal connector may be coupled with the terminal pins 42*a-c* or 42*d-f*, or with the terminal pins 424-*c* or 44*d-f*. In some cases, the spring contacts 36*a-f* on the first side 18 may be used to couple the electronic device 10 with one device while the terminal pins 44*a-f* on the second side 20 may be used to couple the electronic device 10 with a second different device. The reverse configuration is also contemplated.

Each of the first spring contacts 36*a-f* may generally have a shape which allows it to flex under an applied force. For example, the first spring contacts 36*a-f* may have a generally "U" shaped configuration including a first flexible arm 46*a-f*, a second arm 48*a-f*, and an interconnecting arm 50*a-f* extending between and generally orthogonal to the first flexible arm 46*a-f* and the second arm 48*a-f*. The first flexible arm 46*a-f* may be configured to flex towards an intermediate region 52*a-f* of the electrical connectors 28 under an applied force, although this is not required. Similarly, the second spring contacts 38*a-f* may have a generally "U" shaped configuration including a first flexible arm 54*a-f*, a second arm 56*a-f*, and an interconnecting arm 58*a-f* extending between and generally orthogonal to the first flexible arm 54*a-f* and the second arm 56*a-f* The first flexible arm 54*a-f* may be configured to flex towards an intermediate region 52*a-f* of the electrical connectors 28 under an applied force, although this is not required.

The first spring contacts 36*a-f* may be coupled or connected to the corresponding conductive bridge 40*a-f* via a connecting portion 58*a-f*. The connecting portion 58*a-f* may have an "L" or stepped configuration such that the first spring contact 36*a-f* is laterally spaced or offset from the conductive bridge 40*a-f*, although this is not required. In some cases, the connecting portion may generally match or conform to a stepped configuration in the housing 12. Similarly, the second spring contact 38*a-f* may be coupled or connected to the conductive bridge 40*a-f* via a connecting portion 60*a-f*. The connecting portion 60*a-f* may have an "L" or stepped configuration such that the second spring contact 38*a-f* is laterally spaced or offset from the conductive bridge 40*a-f*, although this is not required. In some cases, the connecting portion may generally match or conform to a stepped configuration in the housing 12, as will be described in more detail herein.

Returning briefly to FIG. 2, each of the conductive bridges 40*a-f* may be housed by or within the housing 12 and may extend from a location adjacent to the first side 18 to a location adjacent to the second side 20. At least a portion of the first and second spring contacts 36*a-f*, 38*a-f* extend outside of the housing 12 or are otherwise accessible from outside of the housing 12. For example, each of the first flexible arms 46*a-f* of the first spring contacts 36*a-f* may extend from and/or be accessible from the first side 18 of the housing 12. Similarly, each of the first flexible arms 54*a-f* of the second spring contacts 38*a-f* may extend from and/or be accessible from the second side 20 of the housing 12. It is further contemplated that the first terminal pins 42*a-f*, may extend outside of housing 12 and/or be accessible from the first side 18 of the housing 12. Similarly, the second terminal pins 44*a-f* may extend outside of housing 12 and/or be accessible from the second side 20 of the housing 12.

In some cases, each of the first and/or second terminal pins 42*a-f*, 44*a-f* may be accessible within or from a recess or terminal port (e.g. 30*a*) defined by the housing 12. For example, the first side 18 of the housing 12 may define a first terminal port 30*a* for receiving a female terminal connector (not explicitly shown). Similarly, the second side 20 of the housing 12 may define a second terminal port (not explicitly shown) for receiving a female terminal connector (not explicitly shown). In some cases, the first side 18 of the housing 12 may define a third terminal port (e.g. 30*c*) for receiving a female terminal connector (not explicitly shown) and the second side 20 of the housing 12 may define a fourth terminal port (not explicitly shown) for receiving a female terminal connector (not explicitly shown).

Returning to FIG. 3, each of the electrical connectors 28*a-f* may further include a terminal receiving slot 62*a-f* In some cases, the terminal receiving slot 62*a-f* may extend generally orthogonal to a longitudinal axis of the conductive bridge 40*a-f*, although this is not required. The terminal receiving slot 62*a-f* is configured to slidably receive a connection pin extending from the PCB towards the back 16 of the housing 12 to electrically connect the corresponding electrical connector 28*a-f* to the PCB. In some cases, each of the terminal receiving slots 62*a-f* may be a two-pronged structure, wherein the prongs are configured to bend slightly away from each other when receiving the corresponding connection pin of the PCB to help provide a good tight electrical connection. However, other configurations for electrically coupling the electrical connectors 28*a-f* with the PCB 26 may be used, as desired.

Figure 4:
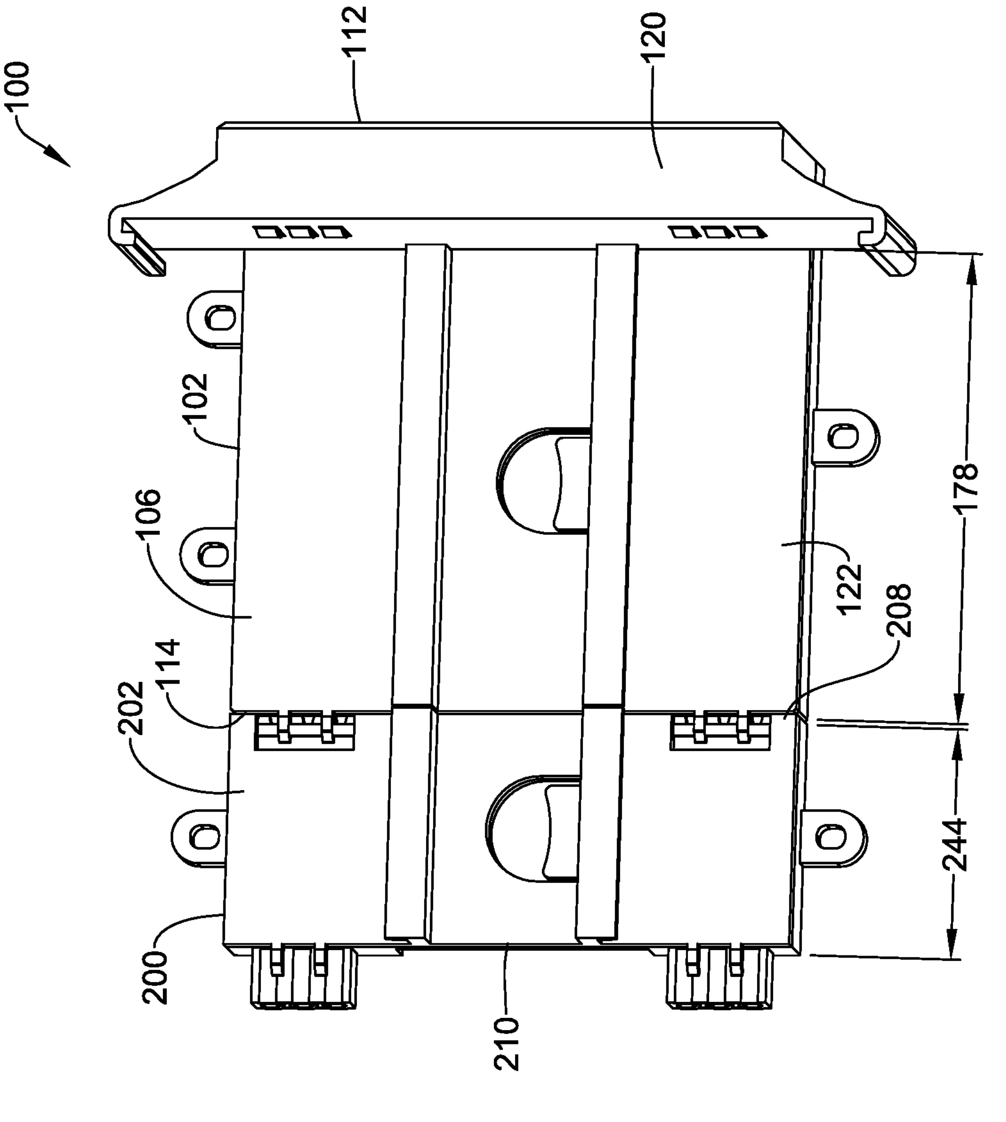
FIG. 4 is a perspective view of an illustrative but non-limiting receiving base.
Figure 5:
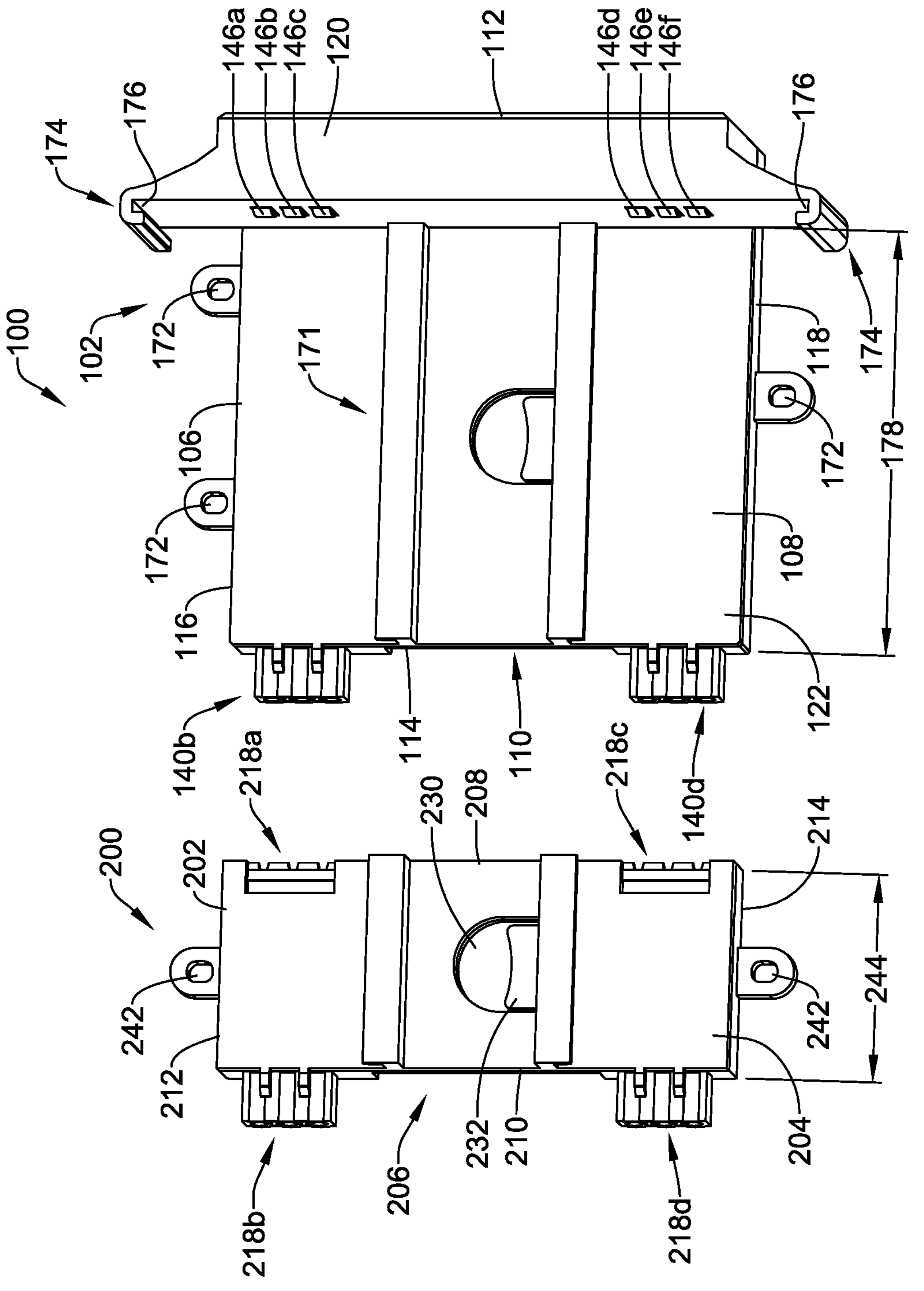
FIG. 5 is a partially exploded perspective view of the illustrative receiving base of FIG. 4.

FIG. 4 is a perspective view of an illustrative but non-limiting receiving controller base 100 having a main unit 102 and an extension unit 200. FIG. 5 is a partially exploded perspective view of the illustrative receiving base 100 of FIG. 4. The receiving base 100 may be configured to receive a controller (such as, but not limited to, a building controller), an I/O device or any other electronic device. The main unit 102 may include a main unit housing 106 including a front side 108, a back side 110, and at least a first side 112, and a second opposing side 114. The first and second sides 112, 114 may each extend from or between the front 108 to the back 110. The main housing 106 may further include a top 116 and an opposing bottom 118. The top and bottom 116, 118 may extend from or between the first and second sides 112, 114. The use of the terms "front", "back", "first", "second", "top", and "bottom" are not intended to limit the main housing 106 to a particular orientation, but rather to facilitate discussion of relative orientation. Further, the main housing 106 is not limited to a rectangular or generally rectangular structure. Other shapes may be used for the main housing 106, as desired.

The main housing 106 may include a raised end 120 adjacent the first side 112, and a base platform 122 extending laterally from the raised end 120 to the second side 114. The raised end 120 may be configured to project upward from the base platform 122 along the first side 112 of the main housing 106. The raised end 120 may have a thickness that is greater than a thickness of the base platform 122. As will be described in more detail herein, the raised end 120 may be configured to mechanically and electrical couple to an electronic device (e.g. building controller), such as electronic device 10 of FIG. 1 or other component. For example, when an electronic device 10 is secured to the main housing 106, the raised end 120 may extend along at least part of a first side 18 of the housing 12 of the electronic device 10. The base platform 122 may be configured to mechanically and/or electrically couple to an electronic device and/or other component.

In some embodiments, the main housing 106 may further include features configured to align and couple the main unit 102 with another device, such as, but not limited to, electronic device 10. For example, the main housing 106 may include an interconnection structure 174 on the raised end 120 that is configured to releasably couple with a mating structure, such as a tab on another device. The interconnection structure 174 may be a generally "U" shaped bracket defining a slot 176. The slot 176 may be configured to slide over a tab on the electronic device 10 to align and connect the two components. This is just one illustrative example. Other connection structures may be used as desired. Further, in some cases, the interconnection structure may not be present.

The extension unit 200 may include an extension housing 202 including a front side 204, a back side 206, and at least a first side 208, and a second opposing side 210. The first and second sides 208, 210 may each extend from or between the front 204 to the back 206. The housing 202 may further include a top 212 and an opposing bottom 214. The top and bottom 212, 214 may extend from or between the first and second sides 208, 210. The use of the terms "front", "back", "first", "second", "top", and "bottom" are not intended to limit the extension housing 202 to a particular orientation, but rather to facilitate discussion of relative orientation. Further, the housing 202 is not limited to a rectangular or generally rectangular structure. Other shapes may be used for the housing 202, as desired.

The main unit 102 and the extension unit 200 may have differing device receiving widths. For example, the base platform 122 of the main unit 102 may have a first width 178 and the extension unit 200 may have a second width 244 less than the first width 178. In some cases, the first width 178 may be about 70 millimeters and the second width 244 may be about 35 millimeters. This is just one example. Other widths may be used as desired. Differing widths 178, 244 may allow the main unit 102 to be used alone or combined with one or more extension units 200 to form a receiving base 100 sized to receive a desired electronic device. For example, this combination may be used to receive electronic devices with widths of 35 millimeters (one extension unit 200), 70 millimeters (one main unit 102), 105 millimeters (one main unit 102 and one extension unit 200), and 140 millimeters (one main unit 102 and two extension units 200). These are just examples.

Figure 6:
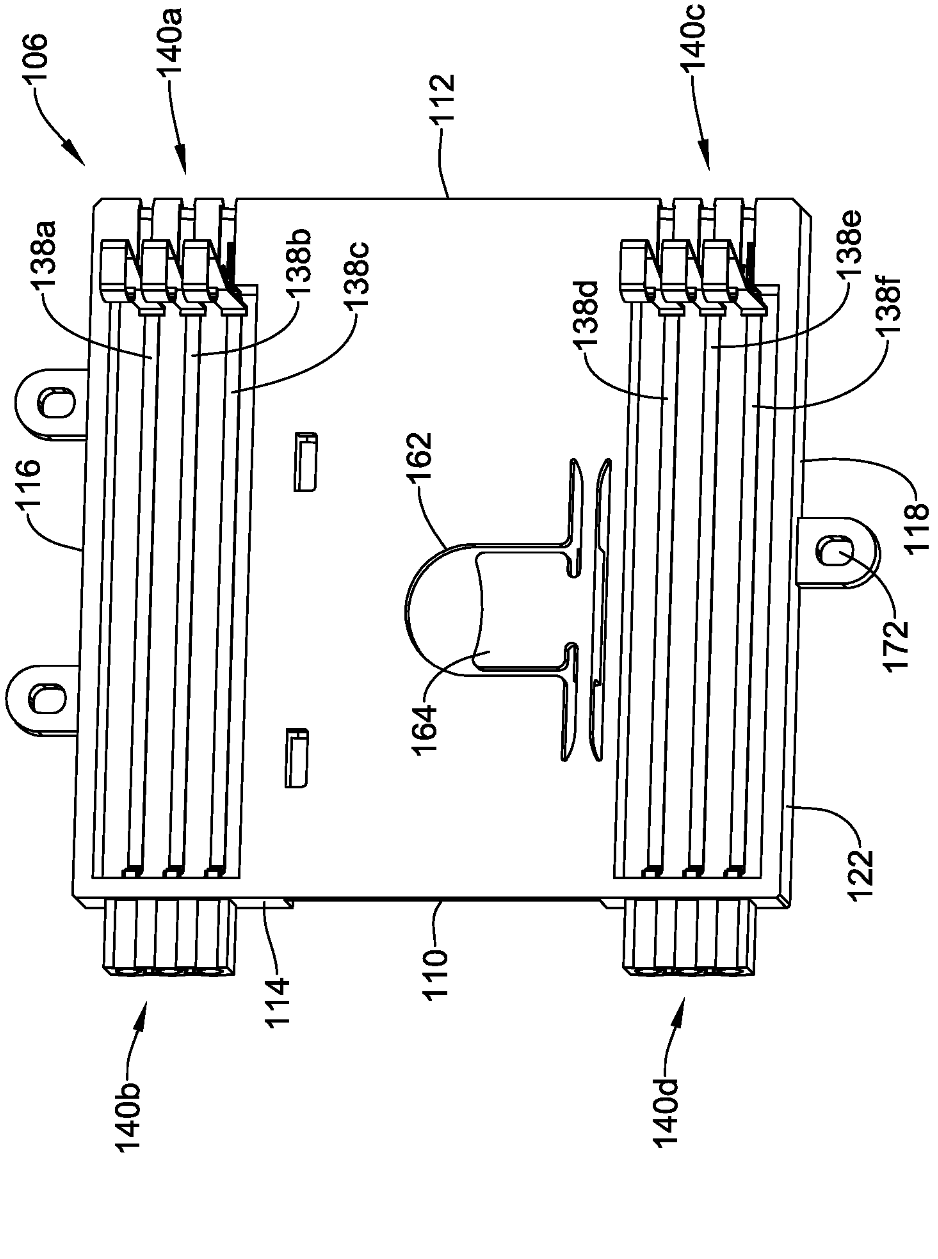
FIG. 6 is a perspective view of the illustrative main unit of FIG. 4 with the front of the housing removed.

FIG. 6 is a perspective view of the illustrative main unit 102 of FIG. 4 with the front 108 of the main housing 106 removed. The main unit 102 include one or more apertures 172 for receiving a fixation mechanism therethrough. For example, a fixation mechanism, such as, but not limited to a screw, bolt, etc. may be used to secure the main unit 102 in a desired mounting surface. The main unit 102 may include one or more electrical connectors 138*a-f* (collectively, 138). Each of the electrical connectors 138 may be configured to be electrically connected to an electronic device, such as electronic device 10 and/or to another receiving base 100 and/or extension unit 200. The main unit 102 may include any number of base electrical connectors 138 as desired. The electrical connectors 138 may be grouped together as a first and second plurality of electrical connectors 138 to form ports 140*a-d* (collectively, 140). For example, the number of electrical connectors 138 provided may depend on the electronic device 10 that the main unit is intended to receive and interface with. For example, a first port type may require three electrical connectors to form a port 140*a*. A first electrical connector 138*a* of the port may be for power, a second electrical connector 138*b* of the port 140*a* may be for ground, and a third electrical connector 138*c* of the port 140*a* may be for serial data. Another port type (e.g., RS485) may require six electrical connectors 138*a-f* to form two ports 140*a*, 140*c*. The first port 140*a* may be for power while the second port 140*c* is for data. These are just examples. In some cases, the electrical connectors 138 may extend from the first side 112 of the main housing 106 to the second side 114 of the main housing 106 such that each group of three electrical connectors 138*a-c*, 138*d-f* forms two ports 140*a*, 140*b* and 140*c*, 140*d*, respectively. It should be understood that the ports 140*a*, 140*c* provided on the first side 112 may be connected to a first device or component while the ports 140*b*, 140*d* on the second side 114 may be connected to a second, different device or component, providing a pass through connection. For example, the ports 140*a*, 140*c* may be for receiving an input and/or delivering an output from a first device while the ports 140*b*, 140*d* may be for receiving an input and/or delivering an output to a second or different device. In some cases, only two of the ports may be provided. For example, two of the ports (e.g., port 140*a* and port 140*b* or port 140*c* and port 140*d*) may not be present. In some cases, only one port may be provided.

Figure 7:
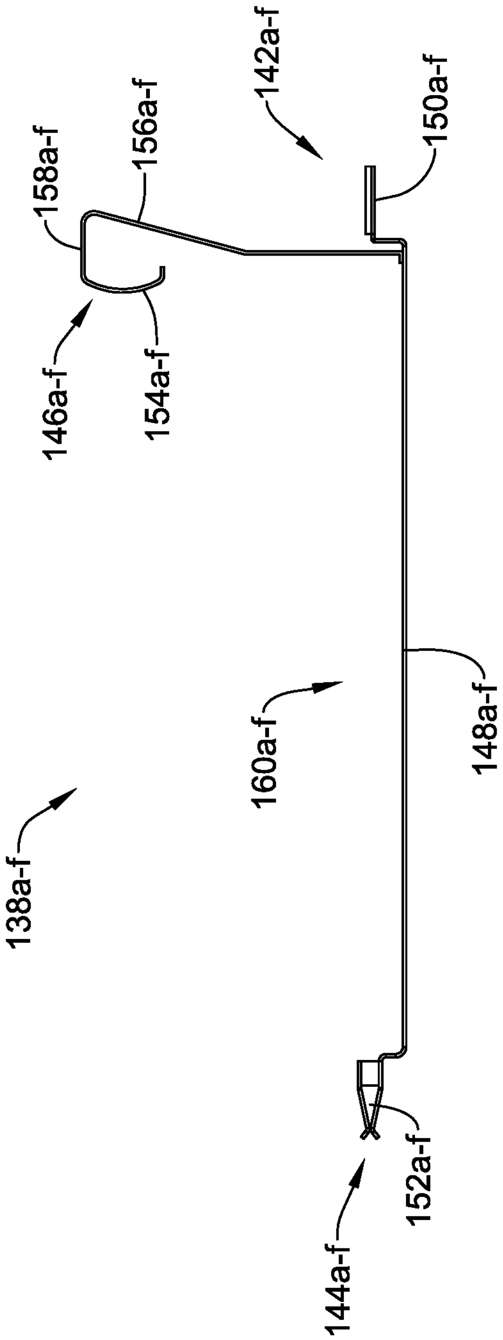
FIG. 7 is a perspective view of one of the plurality of electrical conductors of FIG. 6 shown in detail.

FIG. 7 is a perspective view of one of the plurality of electrical conductors 138*a-f* of FIG. 6 shown in detail. In the example shown, each electrical conductor 138*a-f* of the main unit 102 has an identical structure to that described with respect to FIG. 7. However, in other examples, one or more of the electrical conductors 138*a-f* may have a different structure. The electrical conductor 138*a-f* extend from a first end 142*a-f* to a second end 144*a-f*. Each of the electrical conductors 138*a-f* may include a touch flake or spring contact 146*a-f* adjacent to the first end 142*a-f* thereof. Each spring contact 146*a-f* may be mechanically and electrically connected or coupled to and extend from a base or an electrically conductive bridge 148*a-f*. Each of the electrical conductors 138*a-f* may further include a terminal pin 150*a-f* adjacent to the first end 142*a-f* thereof. In some cases, the terminal pin 150*a-f* may extend generally parallel to a longitudinal axis of the conductive bridge 148*a-f*, although this is not required. Each terminal pin 150*a-f* may be mechanically and electrically connected or coupled to and extend from the electrically conductive bridge 148*a-f*. The electrical conductor 138*a-f* may further include a terminal receiving slot 152*a-f* adjacent to the second end 144*a-f* thereof. In some cases, the terminal receiving slot 152*a-f* may extend generally parallel to a longitudinal axis of the conductive bridge 148*a-f*, although this is not required. Each terminal receiving slot 152*a-f* may be mechanically and electrically connected or coupled to and extend from the electrically conductive bridge 148*a-f*. The conductive bridge 148*a-f* may mechanically and electrically connect all of the spring contacts 146*a-f*, the terminal pins 150*a-f*, and the terminal receiving slots 152*a-f*.

In some cases, the spring contacts 146*a-f*, the terminal pins 150*a-f*, the terminal receiving slots 152*a-f*, and the conductive bridge 148*a-f* of each of the plurality of electrical conductors 138*a-f* may be formed as a single monolithic structure. For example, each of the electrical conductor 138*a-f* may be stamped from a single monolithic electrically conductive material. In other cases, one or more of the spring contacts 146*a-f*, the terminal pins 150*a-f*, the terminal receiving slots 152*a-f*, and/or the conductive bridge 148*a-f* may be formed as a discrete structure and subsequently coupled to the other components. Some illustrative, but non-limiting, coupling techniques may include, but are not limited to, welding, soldering, brazing, etc.

In some cases, the spring contacts 146*a-f*, the terminal pins 150*a-f*, and/or the terminal receiving slots 152*a-f* of each of the plurality of electrical conductors 138*a-f* may be used to form an electrical connection with another device. For example, as will be described in more detail herein, the spring contacts 146*a-f* may be brought into contact with similar spring contacts of another device, such as, but not limited to, an electronic device 10, to form an electrical connection therebetween. In another example, a female terminal connector (such as, but limited to, a female terminal connector of another main unit or extension unit) may be coupled with corresponding terminal pins 150*a-f* In another example, a male terminal connector (such as, but limited to, a male terminal connector of another main unit or extension unit) may be coupled with corresponding terminal receiving slots 152*a-f*.

Each of the spring contacts 146*a-f* may generally have a shape which allows it to flex under an applied force. For example, a first spring contact 146*a* may have a generally "U" shaped configuration including a first flexible arm 154*a*, a second arm 156*a*, and an interconnecting arm 158*a* extending between and generally orthogonal to the first flexible arm 154*a* and the second arm 156*a*. The first spring contact 146*a* may be coupled or connected to the conductive bridge 148*a* via the second arm 156*a*. The first flexible arm 154*a* may be configured to flex away from an intermediate region 160*a* (or towards the first end 142*a*) of the electrical conductor 138*a-f* under an applied force. The other spring contacts 146*b-f* may have a similar construction.

Returning to FIG. 6, the conductive bridges 148*a-f* may be housed by or within the main housing 106 and may extend from a location adjacent to the first side 112 to a location adjacent to the second side 114. At least a portion of the spring contacts 146*a-f* extend outside of the main housing 106 or are otherwise accessible from outside of the main housing 106. For example, the first flexible arms 154*a-f* of the spring contacts 146*a-f* may extend from and/or be accessible from the raised end 120 adjacent the first side 112 of the main housing 106. When an electronic device 10 is secured to the main housing 106 via the one or more attachment features, the spring contacts 146*a-f* of the base electrical connector 138*a-f* may extend outside of the main housing 106 at a location along the raised end 120 facing the first side 18 of the electronic device 10 and in alignment with the spring contacts 46*a-f* of the electronic device electrical connector 28*a-f* It is further contemplated that the terminal pins 150*a-f* (see FIG. 7) may extend outside of main housing 106 and/or be accessible from the first side 112 of the main housing 106. Similarly, the terminal receiving slots 152*a-f* (see FIG. 7) may extend outside of base housing 106 and/or be accessible from the second side 114 of the main housing 106.

In some cases, the terminal pins 150*a-f* and terminal receiving slots 152*a-f* may be accessible within or from a recess or terminal port 140*a-d* defined by the main housing 106. For example, the first side 112 of the main housing 106 may define a first terminal port 140*a* for receiving a terminal connector (not explicitly shown). Similarly, the second side 114 of the main housing 106 may define a second terminal port 140*b* for receiving a terminal connector (not explicitly shown). In some cases, the first side 112 of the main housing 106 may define a third terminal port 140*c* for receiving a terminal connector (not explicitly shown) and the second side 114 of the main housing 106 may define a fourth terminal port 140*d* for receiving a terminal connector (not explicitly shown). In some cases, the terminal ports 140*a*, 140*c* in the first side 112 of the main housing 106 may be female ports for receiving male terminal connectors and the terminal ports 140*b*, 140*d* in the second side 114 of the main housing 106 may be male ports for receiving a receiving a female terminal port. The reverse configuration is also contemplated.

Figure 8:
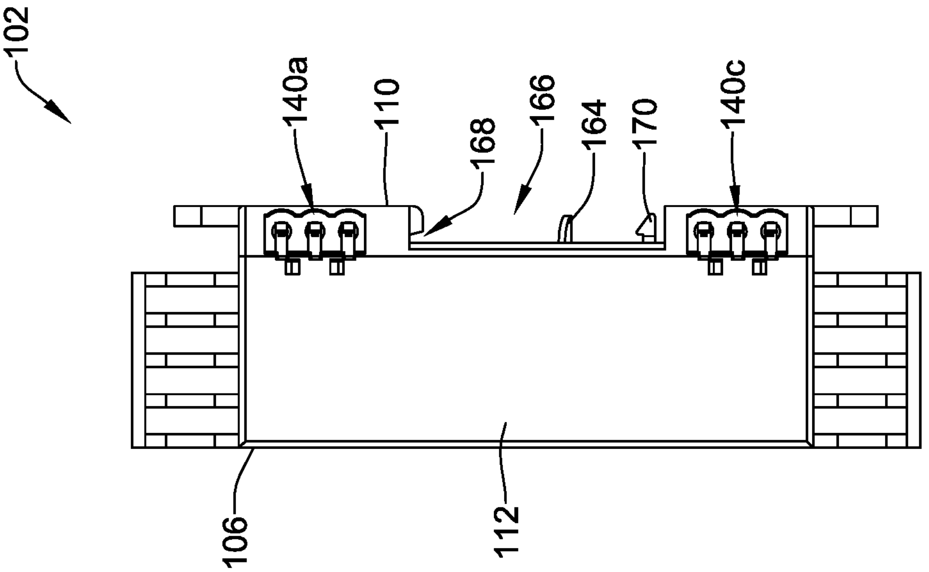
FIG. 8 is a side view of the illustrative main unit of FIG. 4.

It is further contemplated the main housing 106 may further include one or more attachment features for releasably securing the main unit 102 to an electronic device and/or to a mounting feature. The back 110 of the main housing 106 may include an opening or aperture 162 (see FIG. 6). An actuatable tab 164 may extend into the opening 162. The actuatable tab 164 may be configured to be actuated to releasably secure the main housing 106 to a mounting system, such as, but not limited to, a DIN rail. Referring to FIG. 8, which illustrates a side view of the illustrative main unit 102, the actuatable tab 164 may extend into a recess 166 in the back 110 of the main housing 106. The recess 166 may include a DIN rail receiving slot 168 configure to rest on an upper edge of a DIN rail (not shown). A latch 170 may be operably coupled to the actuatable tab 164 and may be configured to grip a lower edge of a DIN rail. When it is desired to remove the main unit 102 from a DIN rail, a user may move the actuatable tab 164 to release the latch 170 from the DIN rail, angle the main unit 102, and lift it from the DIN rail. Further, the front 108 of the main housing 106 may form a DIN rail 171 (see, for example, FIG. 5) that is configured to be received by a DIN rail receiving slot 15 (see, for example, FIG. 1) on a back side of an electronic device housing 12, which can be used to releasably secure the electronic device 10 to the main housing 106 when desired.

Figure 9:
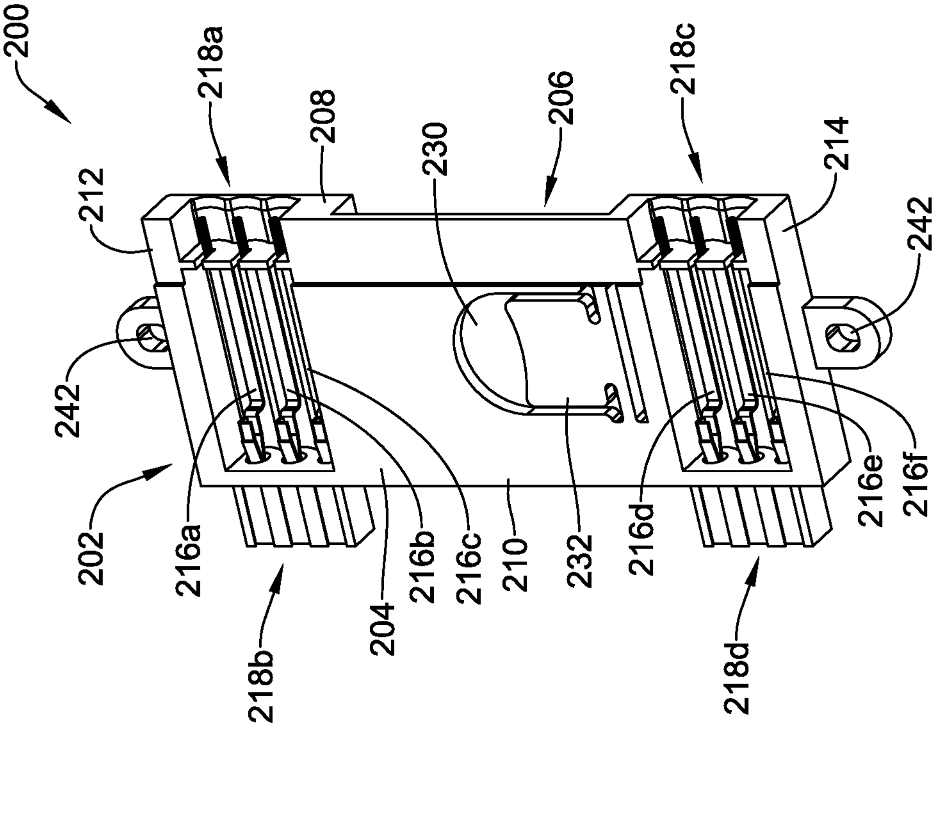
FIG. 9 is a perspective view of the illustrative extension unit of FIG. 4 with the front of the housing removed.

FIG. 9 is a perspective view of the illustrative extension unit 200 of FIG. 4 with the front 204 of the housing 202 removed. The extension unit 200 may include one or more apertures 242 for receiving a fixation mechanism therethrough. For example, a fixation mechanism, such as, but not limited to a screw, bolt, etc. may be used to secure the extension unit 200 in a desired location. The extension unit 200 may include one or more electrical connectors 216*a-f* (collectively, 216). Each of the electrical connectors 216 may be configured to be electrically connected to an electronic device, such as electronic device 10 and/or to another receiving base 100 and/or extension unit 104. The extension unit 200 may include any number of electrical connectors 216 as desired. The electrical connectors 216 may be grouped together as a first and second plurality of electrical connectors 216 to form ports 218*a-d* (collectively, 218). For example, the number of electrical connectors 216 provided may depend on the electronic device 10 that the extension unit 200 is intended to interface with. For example, a first port type may require three electrical connectors to form a port 218*a*. A first electrical connector 216*a* of the port may be for power, a second electrical connector 216*b* of the port 218*a* may be for ground, and a third electrical connector 216*c* of the port 218*a* may be for serial data. Another port type (e.g., RS485) may require six electrical connectors 216*a-f* to form two ports 218*a*, 218*c*. The first port 218*a* may be for power while the second port 218*c* is for data. These are just examples. In some cases, the electrical connectors 216 may extend from the first side 208 of the extension housing 202 to the second side 210 of the extension housing 202 such that each group of three electrical connectors 216*a-c*, 216*d-f* forms two ports 218*a*, 218*b* and 218*c*, 218*d*, respectively. It should be understood that the ports 218*a*, 218*c* provided on the first side 208 may be connected to a first device or component while the ports 218*b*, 218*d* on the second side 210 may be connected to a second, different device or component, providing a pass through connection. For example, the ports 218*a*, 218*c* may be for receiving an input and/or delivering an output from a first device while the ports 218*b*, 218*d* may be for receiving an input and/or delivering an output to a second or different device. In some cases, only two of the ports may be provided. For example, two of the ports (e.g., port 218*a* and port 218*b* or port 218*c* and port 218*d*) may not be present. In some cases, only one port may be provided.

Figure 10:
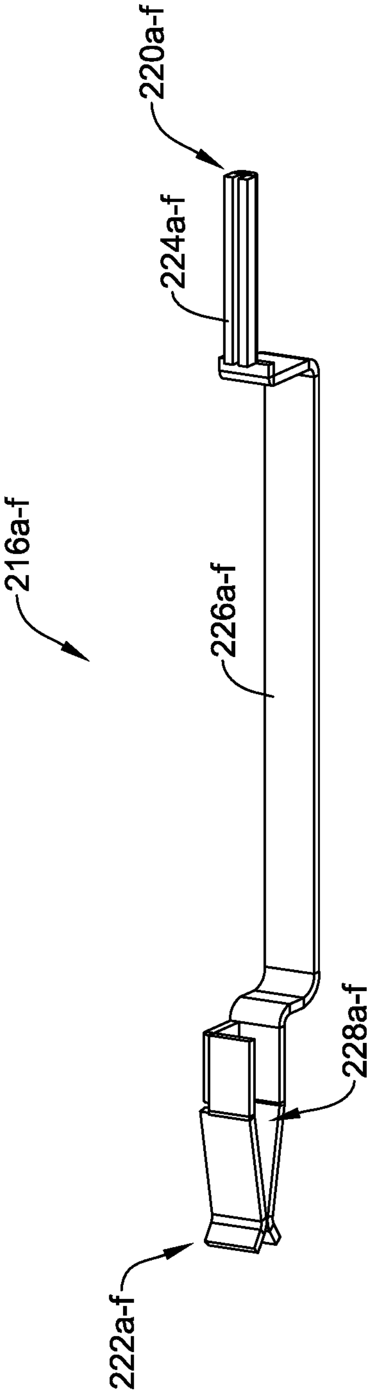
FIG. 10 is a perspective view of one of the plurality of electrical conductors shown in FIG. 9.

FIG. 10 is a perspective view of one of the plurality of electrical conductors 216*a-f* of FIG. 9 shown in detail. In the example shown, each electrical conductor 216*a-f* of the extension unit 200 has an identical structure to that described with respect to FIG. 10. However, in other examples, one or more of the electrical conductors 216*a-f* may have a different structure. Each of the electrical conductors 216*a-f* extend from a first end 220*a-f* to a second end 222*a-f* Each electrical conductors 216*a-f* may further include a terminal pin 224*a-f* adjacent to the first end 220*a-f* thereof. Each terminal pin 224*a-f* may be mechanically and electrically connected or coupled to and extend from a base or an electrically conductive bridge 226*a-f* In some cases, the terminal pin 224*a-f* may extend generally parallel to a longitudinal axis of the conductive bridge 226*a-f*, although this is not required. The electrical conductor 216*a-f* may further include a terminal receiving slot 228*a-f* adjacent to the second end 222*a-f* thereof. In some cases, the terminal receiving slot 228*a-f* may extend generally parallel to a longitudinal axis of the conductive bridge 226*a-f*, although this is not required. Each terminal receiving slot 228*a-f* may be mechanically and electrically connected or coupled to and extend from the corresponding electrically conductive bridge 226*a-f* The conductive bridge 226*a-f* may mechanically and electrically connect the terminal pins 224*a-f* and the terminal receiving slots 228*a-f* of the corresponding electrical conductor 216*a-f*.

In some cases, the terminal pins 224*a-f*, the terminal receiving slots 228*a-f*, and the conductive bridge 226*a-f* of each of the electrical conductors 216*a-f* may be formed as a single monolithic structure. For example, each of the electrical conductors 216*a-f* may be stamped from a single monolithic electrically conductive material. In other cases, one or more of the terminal pins 224*a-f*, the terminal receiving slots 228*a-f*, and/or the conductive bridge 226*a-f* may be formed as a discrete structure and subsequently coupled to the other components. Some illustrative, but non-limiting, coupling techniques may include, but are not limited to, welding, soldering, brazing, etc.

In some cases, the terminal pins 224*a-f* and/or the terminal receiving slots 228*a-f*, may be used to form an electrical connection with another device. For example, a terminal connector (such as, but limited to, a terminal connector of another main unit or extension unit) may be coupled with the terminal pins 224*a-f* In another example, a terminal connector (such as, but limited to, a terminal connector of another main unit or extension unit) may be coupled with the terminal receiving slots 228*a-f*.

Returning to FIG. 9, the conductive bridge 226*a-f* may be housed by or within the housing 202 and may extend from a location adjacent to the first side 208 to a location adjacent to the second side 210. The terminal pins 224*a-f* may extend outside of housing 202 and/or be accessible from the first side 208 of the housing 202. Similarly, the terminal receiving slots 228*a-f* may extend outside of housing 202 and/or be accessible from the second side 210 of the housing 202.

In some cases, the terminal pins 224*a-f* and the terminal receiving slots 228*a-f* may be accessible within or from a recess or terminal port 218*a-d* defined by the housing 202. For example, the first side 208 of the housing 202 may define a first terminal port 218*a* for receiving a terminal connector (not explicitly shown). Similarly, the second side 210 of the housing 202 may define a second terminal port 218*b* for receiving a terminal connector (not explicitly shown). In some cases, the first side 208 of the housing 202 may define a third terminal port 218*c* for receiving a terminal connector (not explicitly shown) and the second side 210 of the housing 202 may define a fourth terminal port 218*d* for receiving a terminal connector (not explicitly shown). In some cases, the terminal ports 218*a*, 218*c* in the first side 208 of the housing 202 may be female ports for receiving a male terminal connector and the terminal ports 218*b*, 218*d* in the second side 210 of the housing 202 may be male ports for receiving a female terminal port. The reverse configuration is also contemplated.

Figure 11:
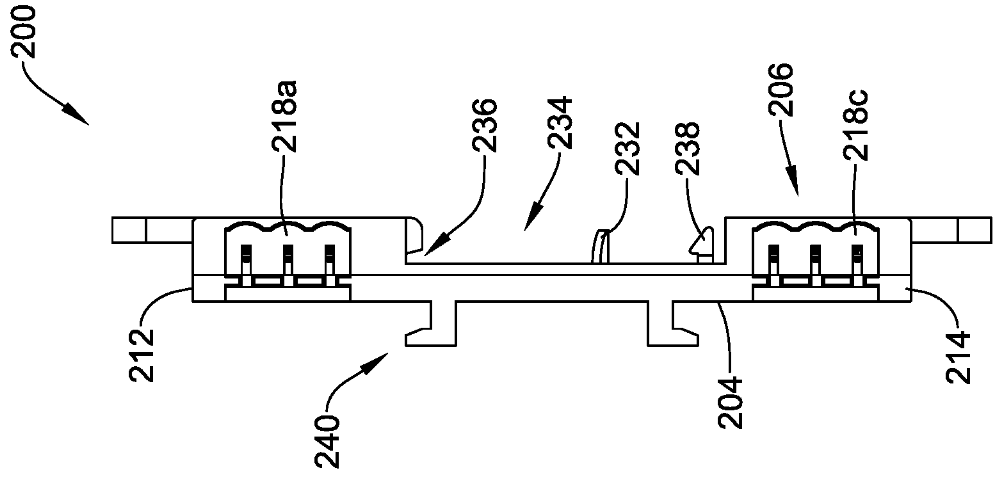
FIG. 11 is a side view of the illustrative main unit of FIG. 4.

It is further contemplated the extension housing 202 may include one or more attachment features for releasably securing the extension unit 200 to an electronic device and/or to a mounting feature. The back 206 of the extension housing 202 may include an opening or aperture 230. An actuatable tab 232 may extend into the opening 230. The actuatable tab 232 may be configured to actuated to releasably secure the extension housing 202 to a mounting system, such as, but not limited to, a DIN rail. Referring additionally to FIG. 11 which illustrates a side view of the illustrative extension unit 200, the actuatable tab 232 may extend into a recess 134 in the back 206 of the housing 202. The recess 234 may further include a DIN rail receiving slot 236 configured to rest on an upper edge of a DIN rail. A latch 238 may be operably coupled to the actuatable tab 232 and configured to grip a lower edge of a DIN rail. When it is desired to remove the extension unit 200 from a DIN rail, a user may move the actuatable tab 232 to release the latch 238 from the DIN rail, angle the extension unit 200, and lift it from the DIN rail. Further, the front 204 of the extension housing 202 may include a DIN rail 240 that is configured to be received by a DIN rail receiving slot 15 (see, for example, FIG. 1) on a back side of the electronic device housing 12 when the electronic device 10 is secured to the housing 202.

Returning to FIGS. 4 and 5, the main unit 102 may be configured to be releasably mechanically and electrically coupled to the extension unit 200, although this is not required. For example, the ports 140*b*, 140*d* on the second side 114 of the main unit 102 may be configured to be received in the ports 218*a*, 218*c* on the first side 208 of the extension unit 200. When the ports 140*b*, 140*d* of the main unit 102 are coupled with the ports 218*a*, 218*c* of the extension unit 200, the second ends 144*a-f* of the electrical connectors 138*a-f* of the main unit 102 may be electrically coupled with the first ends 220*a-f* of the electrical connectors 216*a-f* of the extension unit 200. For example, the terminal pins 224*a-f* may be received within terminal receiving slots 152*a-f* This may electrically couple the main unit 102 and the extension unit 200 such that power and data may be transmitted therebetween, even when an electronic device 10 not present (e.g. during a hot swap of the electronic device 10). Said differently, when releasably coupled, each of the electrical connectors 216*a-f* of the extension unit 200 are electrically connected to a corresponding one of the electrical connectors 138*a-f* of the main unit 102. While not explicitly shown in FIGS. 4 and 5, additional extension units may be coupled to extension unit 200 adjacent the second side 210 thereof, as desired or necessary to accommodate various width electronic devices 10.

Figure 12:
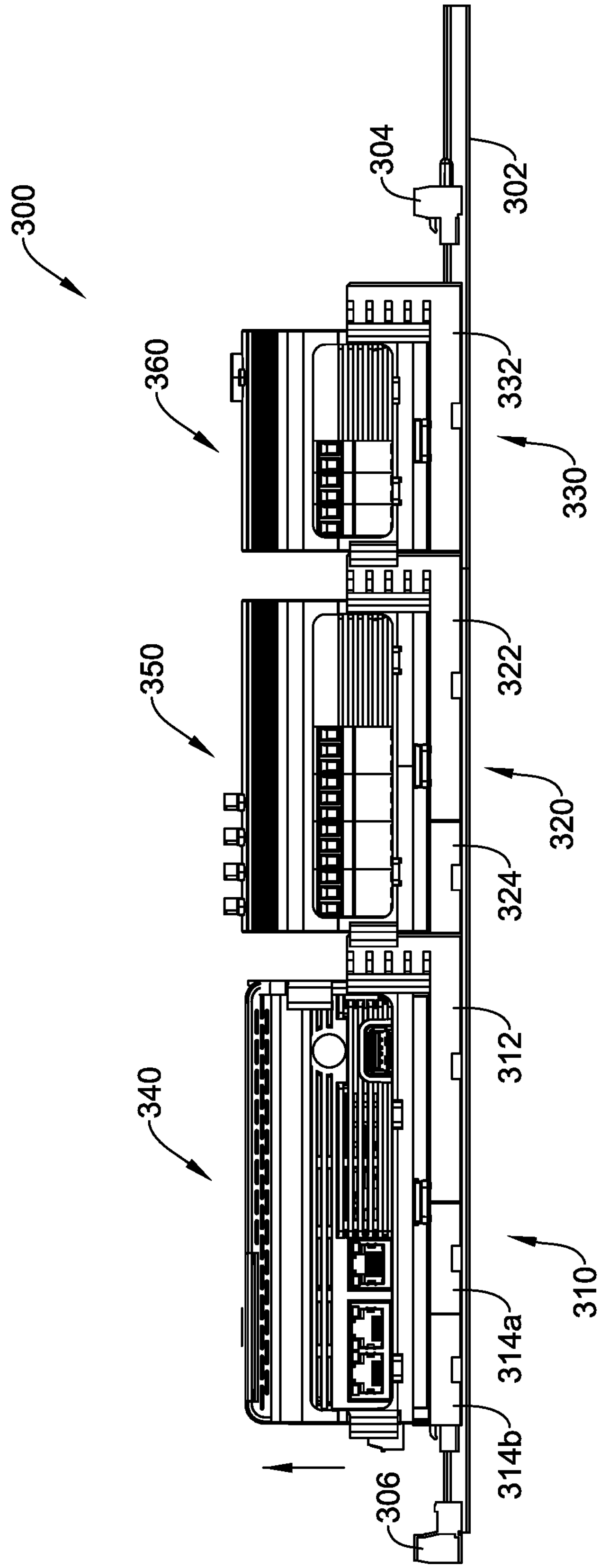
FIG. 12 is an illustrative a bottom view of an illustrative control system including a plurality of receiving bases operatively coupled to a plurality of controllers.

It is further contemplated that more than one receiving base 100 may be coupled together to achieve the desired control system arrangement. FIG. 12 is an illustrative a bottom view of an illustrative control system 300 that includes a plurality of receiving bases 310, 320, 330. The receiving bases 310, 320, 330 may include at least one main unit that is similar in form and function to main unit 102 and optionally, one or more extension units that are similar in form and function to extension unit 200. Each receiving base 310, 320, 330 may be configured to receive an individual electronic device. For example, the first receiving base 310 may be configured to receive a controller 340, such as, but not limited to, a building controller, the second receiving base 320 may be configured to receive a first input/output device 350, and the third receiving base 330 may be configured to receive a second input/output device 360. A control system 300 may include fewer than three or greater than three control devices, as desired. Each of the receiving bases 310, 320, 330 may be releasably secured to a DIN rail 302 via a DIN rail receiving slot (similar in form and function to receiving slots 168, 236) on a back side thereof. In some cases, an actuatable tab and latch assembly form an attachment feature for releasably securing the receiving bases (and components thereof) to the DIN rail.

Each of the electronic devices 340, 350, 360 may have a different width. As such, each receiving base 310, 320, 330 may have a differing width configured to correspond to the width of its respective electronic device. For example, the controller 340 may have a width such that a main unit 312 and two extension units 314*a*, 314*b* (collectively, 314) are required to span a width of the controller 340. The main unit 312 is electrically coupled to the first extension unit 314*a* via mating ports and the second extension unit is electrically coupled to the second extension unit 314*b* via mating ports. The controller 340 may include a tab configured to engage an interconnection structure on the main unit 312 to align the controller with the receiving base 310. When assembled with the receiving base, electrical connectors of the controller (similar in form and function to spring contacts 36*a-f*) electrically engage the spring contacts (similar in form and function to spring contacts 146*a-f*) of the main unit 312. Thus, power and data may be transmitted from the controller 340 through the receiving base 310. Further, when the controller 340 is secured to the receiving base, a DIN rail extending along the combined width of the main unit 312 and the extension units 314 may be configured to be received by a DIN rail receiving slot on a back side of the controller 340. An attachment feature may secure the controller 340 to the receiving base 310.

The first input/output device 350 may have a width such that a main unit 322 and one extension units 324 are required to span a width of the first input/output device 350. The main unit 322 is electrically coupled to the extension unit 324 via mating ports. The first input/output device 350 may include a tab configured to engage an interconnection structure on the main unit 322 to align the first input/output device 350 with the receiving base 320. When assembled with the receiving base, electrical connectors of the input/output device 350 (similar in form and function to spring contacts 36*a-f*) electrically engage the spring contacts (similar in form and function to spring contacts 146*a-f*) of the main unit 322. Thus, power and data may be transmitted from the first input/output device 350 through the receiving base 320. Further, when the first input/output device 350 is secured to the receiving base, a DIN rail extending along the combined width of the main unit 322 and the extension unit 324 may be configured to be received by a DIN rail receiving slot on a back side of the first input/output device 350. An attachment feature may secure the first input/output device 350 to the receiving base 320.

The second input/output device 360 may have a width such that only a main unit 332 is required to span a width of the second input/output device 360. When assembled with the receiving base 330, electrical connectors of the input/output device 360 (similar in form and function to spring contacts 36*a-f*) electrically engage the spring contacts (similar in form and function to spring contacts 146*a-f*) of the main unit 332. Thus, power and data may be transmitted from the second input/output device 360 through the receiving base 330. Further, when the second input/output device 360 is secured to the receiving base 330, a DIN rail extending along the width of the main unit 322 may be configured to be received by a DIN rail receiving slot on a back side of the second input/output device 360. An attachment feature may secure the second input/output device 360 to the receiving base 330.

It is further contemplated that the first, second, and third receiving bases 310, 320, 330 may be electrically coupled such that data and power may be transmitted between each of the receiving bases 310, 320, 330. For example, the extension unit 324 of the second receiving base 320 may be electrically coupled to the main unit 312 of the first receiving base 310 via mating ports and the main unit 332 of the third receiving base 330 may be electrically coupled to the main unit 322 of the second receiving base 320 via mating ports. As the bases 310, 320, 330 are electrically coupled to their respective device 340, 350, 360, power and data may be communicated between the devices 340, 350, 360 via the receiving bases 310, 320, 330.

In some cases, additional terminal blocks 304, 306 may be used to extend power and communication from 340, 360 to other devices. For example, the terminal blocks 304, 306 may be received within ports of the receiving bases 310, 330 and used to connect the devices 340, 360 to other devices or receiving bases on a separate DIN rail, that do not include receiving bases, or for remote wiring.

The receiving bases 310, 320, 330 may allow for one or more of the devices 340, 350, 360 to be removed from the base 310, 320, 330 and/or system 300 while power is connected to the respective base 310, 320, 330 (e.g., hot swapping). The frictional contact between the spring contacts on the device and the respective receiving base may allow the device to be easily removed. For example, if it is desired to remove the controller 340, a user may simply grip the top and bottom of the controller 340 and slide the controller 340 out of the receiving base 310, in the direction indicated by arrow 370. The same or a new controller may be reinserted into the receiving base 310 without cutting power to the system 300.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A building controller receiving base configured to receive a building controller, wherein the building controller includes a building controller housing that houses a building controller electrical connector that includes a spring contact extending outside of a side of the building controller housing, the building controller receiving base comprising:

a base housing including a back side, a front side, a first side and an opposing second side each extending from the front side to the back side, and a top and an opposing bottom side each extending between the first side and the second side;

the base housing including a base platform and a raised end, wherein the raised end is configured to project upward from the base platform toward the front side of the base housing;

the base housing including one or more attachment features for releasably securing the building controller to the base platform of the base housing with the spring contact of the building controller electrical connector facing toward the raised end of the base housing;

a base electrical connector housed by the base housing, the base electrical connector includes a spring contact extending outside of the base housing at a location that is raised above the base platform along the raised end of the base housing, the spring contact of the base electrical connector is positioned to aligned with the spring contact of the building controller electrical connector when the building controller is secured to the base platform of the base housing via the one or more attachment features; and the base electrical connector further comprises a first terminal pin and a first terminal receiving slot that extend outside of opposing sides of the base housing and are accessible from outside of their respective opposing side of the base housing.

2. The building controller receiving base of claim 1, wherein the first terminal pin is accessible from the first side of the base housing and the first terminal receiving slot is accessible from the second opposing side of the base housing.

3. The building controller receiving base claim 1, wherein the base electrical connector comprises an electrically conductive bridge housed by the base housing that mechanically and electrically connects the first terminal pin and the terminal receiving slot.

4. The building controller receiving base of claim 1, wherein the base electrical connector comprises an electrically conductive bridge housed by the base housing that mechanically and electrically connects the first terminal pin, the terminal receiving slot and the spring contact of the base electrical connector.

5. The building controller receiving base of claim 1, wherein the base housing defines a first terminal port about the first terminal pin for receiving a first terminal connector, and the base housing further defines a second terminal port about the terminal receiving slot for receiving a second terminal connector.

6. The building controller receiving base of claim 5, wherein the first terminal port is a female port and the second terminal port is a male port.

7. The building controller receiving base of claim 1, wherein the one or more attachment features comprise a DIN rail on a front side of the base housing that is configured to be received by a DIN rail receiving slot on a back side of the building controller housing when the building controller is secured to the base housing via the one or more attachment features.

8. The building controller receiving base of claim 5, wherein a back side of the base housing including a DIN rail receiving slot for receiving a DIN rail on a mounting surface.

9. A modular building controller receiving base comprising:

a main unit, comprising: a main unit housing including a front, a back and at least a first side and an opposing second side; a first plurality of electrical connectors each extending between and accessible from the first side of the main unit housing and the opposing second side of the main unit housing; a second plurality of electrical connectors each extending between and accessible from the first side of the main unit housing and the opposing second side of the main unit housing; wherein each electrical connector of the first plurality of electrical connectors and the second plurality of electrical connectors includes: an electrically conductive bridge housed by the main unit housing; a spring contact mechanically and electrically connected to the electrically conductive bridge, the spring contact extends outside of the main unit housing and is accessible from outside of the main unit housing; wherein the spring contacts of the first plurality of electrical connectors and the spring contacts of the second plurality of electrical connectors are configured to electrically engage a plurality of electrical connectors on a controller when the controller is releasably received by the main unit; and an extension unit, comprising:

an extension unit housing including a front, a back and at least a first side and an opposing second side; a first plurality of electrical connectors each extending between and accessible from the first side of the extension unit housing and the opposing second side of the extension unit housing; a second plurality of electrical connectors each extending between and accessible from the first side of the extension unit housing and the opposing second side of the extension unit housing; and wherein the extension unit is releasably couplable mechanically and electrically to the main unit, wherein when releasably coupled, each of the first plurality of electrical connectors of the extension unit are electrically connected to a corresponding one of the first plurality of electrical connectors of the main unit and each of the second plurality of electrical connectors of the extension unit are electrically connected to a corresponding one of the second plurality of electrical connectors of the main unit.

10. The modular building controller receiving base of claim 9, wherein the main unit has a first width and the extension unit has a second width that is less than the first width.

11. The modular building controller receiving base of claim 9, wherein:

the first side of the main unit housing defines both a first terminal port and a second terminal port each for receiving a male terminal connector; and the second opposing side of the main unit housing defines both a first terminal port and a second terminal port each for receiving a female terminal port.

12. The modular building controller receiving base of claim 11, wherein:

the first side of the extension unit housing defines both a first terminal port and a second terminal port each for receiving a male terminal connector; and the second opposing side of the extension unit housing defines both a first terminal port and a second terminal port each for receiving a female terminal port.

13. The modular building controller receiving base of claim 12, wherein the first terminal port and second terminal port of the main unit are configured to receive the first terminal port and the second terminal port of the extension unit.

14. A modular controller assembly, comprising:

a base and a building controller, the base configured to releasably receive the building controller;

the base comprising:

a base housing including a front, a back and at least a first side and an opposing second side, the base housing including one or more attachment features for releasably securing the building controller to the base housing;

an electrical connector extending between and accessible from the first side of the base housing and the second side of the base housing, the electrical connector including: an electrically conductive bridge housed by the base housing; and a spring contact mechanically and electrically connected to the electrically conductive bridge, the spring contact extends outside of the base housing and is accessible from outside of the base housing;

the building controller comprising:

a controller housing including a front, a back and at least a first side and an opposing second side;

a printed circuit board housed by the controller housing;

an electrical connector electrically connected to the printed circuit board, the electrical connector including a first spring contact, a second spring contact, and an electrically conductive bridge mechanically and electrically connecting the first spring contact and the second spring contact; and wherein the spring contact of the electrical connector of the base is configured to electrically engage the first spring contact of the electrical connector of the building controller when the building controller is releasably secured to the base housing.

15. The modular controller assembly of claim 14, wherein the building controller is configured to be coupled to and/or uncoupled from the base while power is connected to the base.

16. The modular controller assembly of claim 14, wherein the one or more attachment features of the base housing comprise a DIN rail on the front of the base housing that is configured to be received by a DIN rail receiving slot on a back side of the controller housing when the building controller is secured to the base housing via the one or more attachment features, and the back of the base housing comprises a DIN rail receiving slot for receiving a DIN rail on a mounting surface.

17. The modular controller assembly of claim 14, further comprising an extension unit, comprising: a housing including a front, a back and at least a first side and an opposing second side; and an electrical connector extending between and accessible from the first side of the housing and the opposing second side of the housing.

18. The modular controller assembly of claim 17, wherein the extension unit is configured to be releasably coupled mechanically and electrically to the base, and is configured to selectively receive a second building controller.

19. The building controller receiving base of claim 1, wherein the spring contact of the electrician base connector includes a generally "U" shaped configuration comprising a first flexible arm, a second flexible arm, and an interconnecting arm extending between and generally orthogonal to the first flexible arm and the second flexible arm which allows the spring contact to flex under an applied force, wherein at least a portion of the first flexible arm extends outside of a location along the raised end facing the side of building controller housing and in alignment with the spring contact extending outside of the side of the building controller housing.

20. The modular controller assembly of claim 14, wherein the spring contact of the electrician base connector includes a generally "U" shaped configuration comprising a first flexible arm, a second flexible arm, and an interconnecting arm extending between and generally orthogonal to the first flexible arm and the second flexible arm which allows the spring contact to flex under an applied force, wherein at least a portion of the first flexible arm extends outside of a location along the raised end facing the side of building controller housing and in alignment with the spring contact extending outside of the side of the building controller housing.

* * * * *